United States Patent
Guo et al.

(10) Patent No.: US 12,312,461 B2
(45) Date of Patent: May 27, 2025

(54) PVC COMPOSITION, POLYMER COMPOSITE ARTICLE FORMED THEREWITH, AND METHOD OF PREPARING SAME

(71) Applicants: Rohm and Haas Company, Collegeville, PA (US); Dow Silicones Corporation, Midland, MI (US)

(72) Inventors: Hailan Guo, Warrington, PA (US); Manoj Nerkar, Royersford, PA (US); Sharon M. Vuong, Downingtown, PA (US); Igor Chorvath, Midland, MI (US)

(73) Assignees: Rohm and Haas Company, Collegeville, PA (US); Dow Global Technologies LLC, Midland, MI (US)

( * ) Notice: Subject to any disclaimer, the term of this patent is extended or adjusted under 35 U.S.C. 154(b) by 539 days.

(21) Appl. No.: 17/630,282

(22) PCT Filed: Aug. 6, 2020

(86) PCT No.: PCT/US2020/045123
§ 371 (c)(1),
(2) Date: Jan. 26, 2022

(87) PCT Pub. No.: WO2021/026303
PCT Pub. Date: Feb. 11, 2021

(65) Prior Publication Data
US 2022/0275188 A1  Sep. 1, 2022

Related U.S. Application Data

(60) Provisional application No. 62/883,840, filed on Aug. 7, 2019.

(51) Int. Cl.
| | | |
|---|---|---|
| *C08L 27/06* | (2006.01) | |
| *C08K 3/26* | (2006.01) | |
| *C08L 83/04* | (2006.01) | |
| *C08K 3/013* | (2018.01) | |
| *C08K 3/22* | (2006.01) | |

(52) U.S. Cl.
CPC ............ *C08L 27/06* (2013.01); *C08K 3/26* (2013.01); *C08L 83/04* (2013.01); *C08K 3/013* (2018.01); *C08K 2003/2241* (2013.01)

(58) Field of Classification Search
CPC combination set(s) only.
See application file for complete search history.

(56) References Cited

U.S. PATENT DOCUMENTS

| | | | |
|---|---|---|---|
| 3,796,681 A | 3/1974 | Ratliff | |
| 4,539,124 A * | 9/1985 | Butcher | B29C 33/60 428/404 |
| 10,344,135 B2 | 7/2019 | Nishimura | |
| 2018/0244908 A1 | 8/2018 | Rachwal | |

FOREIGN PATENT DOCUMENTS

| | | | | |
|---|---|---|---|---|
| CN | 109054238 A | * | 12/2018 | |
| WO | WO-2007075425 A2 | * | 7/2007 | C08L 27/06 |
| WO | 2019152830 A1 | | 8/2019 | |

OTHER PUBLICATIONS

Machine translation of CN 109054238 (no date).*
Robeson, "Miscible polymer blends containing poly(vinyl chloride)", J. Vinyl Addit Technol., 1990, p. 89-94, vol. 12.
Stevenson, Journal of Vinyl Technology, 1993, p. 244-251, vol. 15, No. 4.

* cited by examiner

*Primary Examiner* — Marc S Zimmer
(74) *Attorney, Agent, or Firm* — Brian L. Mutschler

(57) ABSTRACT

A polyvinyl chloride (PVC) composition and a method for preparing a polymer composite article. The composition comprises (A) a mineral filler in an amount of from 7.5 to 75 wt. %. The composition also comprises (B) a polyvinyl chloride polymer in an amount of from 20 to 92 wt. %. Further, the composition comprises (C) a polydiorganosiloxane in an amount of from greater than 0 to 5 wt. %; the (C) polydiorganosiloxane being a compound of formula (I):

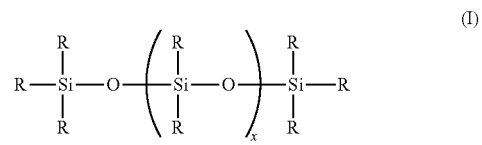

where each R is an independently selected monovalent hydrocarbon group of 1 to 18 carbon atoms that is free of aliphatic unsaturation, and subscript x has a value sufficient to give the (C) polydiorganosiloxane a viscosity of greater than 350 mPa·s to 100,000 mPa·s measured at 25° C. at 0.1 RPM to 50 RPM on a Brookfield DV-III cone & plate viscometer with #CP-52 spindle. The ranges for components (A)-(C) are based on the total weight of components (A), (B) and (C) in the composition.

14 Claims, No Drawings

PVC COMPOSITION, POLYMER COMPOSITE ARTICLE FORMED THEREWITH, AND METHOD OF PREPARING SAME

FIELD OF THE INVENTION

The present invention generally relates to a polyvinyl chloride (PVC) composition and, more specifically, to a PVC composition for preparing a polymer composite article, to methods of preparing the PVC composition and the polymer composite article therewith, and to the polymer composite article formed thereby.

DESCRIPTION OF THE RELATED ART

Polymer composite articles are known in the art and are utilized in various end use applications. Polymer composite articles are increasingly popular with consumers due to cost and desirable properties associated with polymer composite articles, including physical and mechanical properties.

In the PVC industry, it is common to include fillers in the composite articles. Fillers are relatively inexpensive and are often used to lower the cost. Such composite articles are typically produced by thoroughly mixing fillers and PVC to give a mixture. High levels of fillers, however, can adversely affect the properties of the composite articles. For example, high amounts of filler may affect critical properties such as density, percent (%) elongation, impact strength, surface finish, melt flow, melt viscosity, melt strength, and processability.

Due to the nature of PVC, it cannot be processed on its own. Other additives, such as stabilizers, processing aids, and lubricants are required to obtain processability and performance of the polymer. Typically, these additives are mixed in a high speed mixer/blender to make dry blends. High filler levels make it difficult to form uniform dry blends. The system often becomes too dusty and difficult to handle. The filler also tends to stick to the walls and blades of the mixer, resulting in less than the desired amount of filler in the blend. Sticking of the filler also increases the cleaning time of the equipment and may also increase contamination of the next batch.

Conventional, low cost, organic process aids generally suffer from the drawback of requiring high loading to achieve faster production speeds, thereby impacting cost and/or performance properties. In addition, many conventional process aids may negatively affect physical properties and reduce mechanical properties (impact resistance, flexural strength, flexural modulus) of the composite articles, especially at elevated use temperatures. Conventional process aids may also migrate from the polymer composite articles, thus negatively impacting one or more properties of the polymer composite articles over time, such as physical properties, appearance, feel, ability to overmold, ability to co-extrude, ability to adhere to the surface, ability to print the surface and ability to paint the surface of the polymer composite articles. In addition some of the organic process aids volatilize at higher application temperatures, which can lead to formation or bubbles and cracks in the polymer composite articles, which can compromise long term performance of these articles.

High filler levels also tend to increase the density of the polymer system. Increased density increases the weight of the final composite articles, which may in turn increase associated shipping costs. When foamed, high filler levels also inhibit expansion of the polymer.

High filler levels typically make the polymer system shear sensitive. These systems demonstrate higher shear thinning behavior.

While the use of inorganic fillers may increase char content, which improves smoke and flame properties, mechanical properties such as percent (%) elongation and impact strength are often diminished as a result.

Current PVC compositions require the sacrifice of at least one property for the benefit of another. For example, a PVC composition may be formulated to improve impact strength but would lower percent (%) elongation or it may improve surface finish but would lower throughput or it may provide the desired density but would affect other physical properties.

It would be desirable to provide a polymer system having a high filler content that addresses one or more of the problems above.

BRIEF SUMMARY OF THE INVENTION

The present invention provides a polyvinyl chloride composition for preparing a polymer composite article. The composition comprises (A) a filler in an amount of from 7.5 to 75 wt. %. The composition also comprises (B) a polyvinyl chloride polymer in an amount of from 20 to 92 wt. %. Further, the composition comprises (C) a polydiorganosiloxane in an amount of from greater than 0 to 5 wt. %; the (C) polydiorganosiloxane being a compound of formula (I):

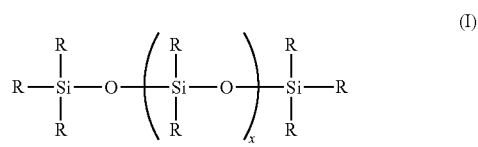

where each R is an independently selected monovalent hydrocarbon group of 1 to 18 carbon atoms that is free of aliphatic unsaturation, and subscript x has a value sufficient to give the (C) polydiorganosiloxane a viscosity of greater than 350 mPa·s to 100,000 mPa·s measured at 25° C. at 0.1 RPM to 50 RPM on a Brookfield DV-III cone & plate viscometer with #CP-52 spindle. The ranges for components (A)-(C) are based on the total weight of components (A), (B) and (C) in the composition.

A method of preparing the composition is also provided. The method of preparing the composition comprises combining the (A) mineral filler, the (B) polymer, and the (C) polydiorganosiloxane, thereby preparing the composition.

Further, a method for preparing a polymer composite article is provided by the present invention. The method comprises preparing the polymer composite article from the composition. In addition, a polymer composite article formed in accordance with the method is also provided.

DETAILED DESCRIPTION OF THE INVENTION

The present invention provides a composition for preparing a polymer composite article. The polymer composite article has excellent physical properties and is suitable for myriad end use applications, as described below. A method of preparing a polymer composite article and the polymer composite article formed thereby are also provided and described below.

The composition for preparing a polymer composite article comprises: (A) a filler in an amount of from 10 to 90 wt. %; (B) a polymer in an amount of from 10 to 90 wt. %; and (C) a polydiorganosiloxane in an amount of from greater than 0 to 10 wt. %; each based on the total weight of components (A), (B) and (C) in the composition.

The composition comprises: (A) a filler in an amount of from 10 to 90 wt. %; (B) a polyvinyl chloride polymer in an amount of from 10 to 90 wt. %; and (C) a polydiorganosiloxane in an amount of from greater than 0 to 5 wt. %; wherein the (C) polydiorganosiloxane is a compound of formula (I):

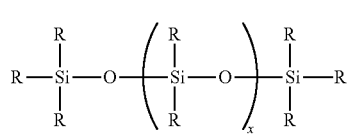

(I)

where each R is an independently selected monovalent hydrocarbon group of 1 to 18 carbon atoms that is free of aliphatic unsaturation, and subscript x has a value sufficient to give the (C) polydiorganosiloxane a viscosity of greater than 350 mPa·s to 100,000 mPa·s measured at 25° C. at 0.1 RPM to 50 RPM on a Brookfield DV-III cone & plate viscometer with #CP-52 spindle. The ranges for components (A)-(C) are based on the total weight of components (A), (B) and (C) in the composition.

Component (A) Mineral Filler

The composition comprises (A) a mineral filler. The (A) mineral filler may form a discontinuous phase in the composition for preparing the polymer composite article and the composite article so prepared.

The (A) mineral filler may be untreated, pretreated, or added in conjunction with an optional filler treating agent, which when so added may treat the (A) mineral filler in situ or prior to incorporation of the (A) mineral filler in the composition. When treated, the (A) mineral filler may be treated by any conventional filler treating agent known in the art. The (A) mineral filler may be a single filler or a combination of two or more fillers that differ in at least one property such as type of filler, method of preparation, treatment or surface chemistry, filler composition, filler shape, filler surface area, average particle size, and/or particle size distribution.

Preferably, the (A) mineral filler comprises at least 90 wt. % of the total weight of filler in the PVC composition, i.e., the PVC composition may comprise up to 10 wt. % of a non-mineral filler. More preferably, the (A) mineral filler comprises at least 95 wt. % of the total weight of filler in the PVC composition. Even more preferably, the filler in the PVC composition consists essentially of or consists of at least one mineral filler. As used herein, "consists essentially of" means that any filler other than a mineral filler present in the PVC composition does not negatively affect any of the physical properties of the PVC composition and/or the processability of the PVC composition. Preferably, the PVC composition comprises less than 5 wt. % of a lignocellulosic filler or an organic filler. More preferably, the PVC composition does not comprise a lignocellulosic filler or an organic filler.

The shape and dimensions of the (A) mineral filler is also not specifically restricted. For example, the (A) mineral filler may be spherical, rectangular, ovoid, irregular, and may be in the form of, for example, a powder, a fiber, a particle, and combinations thereof. Dimensions and shape are typically selected based on the type of the (A) mineral filler utilized, the selection of other components included within the composition, and the end use application of the polymer composite article formed therewith.

Non-limiting examples of mineral fillers that may function as extending or reinforcing fillers include quartz and/or crushed quartz, aluminum oxide, magnesium oxide, silica (e.g. fumed, ground, precipitated), hydrated magnesium silicate, magnesium carbonate, dolomite, silicone resin, wollastonite, soapstone, kaolinite, kaolin, mica muscovite, phlogopite, halloysite (hydrated alumina silicate), aluminum silicate, sodium aluminosilicate, glass (fiber, beads or particles, including recycled glass, e.g. from wind turbines or other sources), clay, magnetite, hematite, calcium carbonate such as precipitated, fumed, and/or ground calcium carbonate, calcium sulfate, barium sulfate, calcium metasilicate, zinc oxide, talc, diatomaceous earth, iron oxide, clays, mica, chalk, titanium dioxide (titania), zirconia, graphite, anthracite, lignite, magnesium oxide, magnesium hydroxide, magnesium oxysulfate fiber, aluminum trihydrate, aluminum oxyhydrate, pigments (e.g. titanium dioxide, non-hydrated, partially hydrated, or hydrated fluorides, chlorides, bromides, iodides, chromates, carbonates, hydroxides, phosphates, hydrogen phosphates, nitrates, oxides, and sulfates of sodium, potassium, magnesium, calcium, and barium); antimony pentoxide, antimony trioxide, beryllium oxide, chromium oxide, lithopone, a borate salt such as zinc borate, barium metaborate or aluminum borate, mixed metal oxides such as vermiculite, bentonite, pumice, perlite, fly ash, clay, and silica gel; pyrophyllite, sepiolite, zinc stannate, zinc sulphide, and combinations thereof. Alternatively the extending or reinforcing filler may be selected from the group consisting of calcium carbonate, talc and a combination thereof.

Extending fillers are known in the art and commercially available; such as a ground silica sold under the name MIN-U-SIL by U.S. Silica of Berkeley Springs, WV Suitable precipitated calcium carbonates include Winnofil™ SPM from Solvay and Ultra-pflex™ and Ultra-pflex™ 100 from SMI.

The (A) mineral filler is present in the composition in an amount of from 7.5 to 75, alternatively from 10 to 65, alternatively from 20 to 60, and alternatively from 49.5 to 60, weight percent based on the total weight of (A), (B) and (C) in the composition. All end points and subranges between 7.5 to 75 weight percent are included and disclosed herein. For example, the (A) mineral filler may be present in an amount of at least 7.5, at least 10, at least 15, at least 20, at least 25, at least 30, at least 35, at least 40, at least 45, or at least 50, weight percent based on the total weight of (A), (B), and (C) in the composition. The (A) mineral filler may be present in an amount of 75 wt. % or less, 70 wt. % or less, 65 wt. % or less, or 60 wt. % or less, relative to the total weight of (A), (B), and (C) in the composition. Alternatively, for certain applications, it is desirable to maximize the relative amount of the (A) mineral filler in the composition, which reduces overall cost thereof, so long as desirable properties of the polymer composite article formed therewith are maintained or obtained. One of skill in the art understands that the amount of the (A) mineral filler may be modified for this purpose, including a balance of cost and resulting properties, as well as the presence or absence of other optional components, as described below.

(B) PVC Polymer

The composition further comprises (B) a PVC polymer. The PVC polymer may form all or a part of a continuous phase in the composition for preparing the polymer composite article and the composite article prepared therefrom. The selection of the (B) PVC polymer is typically a function of the desired end use application of the polymer composite article formed with the composition, as various polymers have different melting point temperatures (and/or glass transition temperatures) and physical/mechanical properties, as well as suitable or acceptable continuous use application temperatures. In certain embodiments, the (B) PVC polymer has a softening point temperature that is less than a degradation temperature of other components in the composition. In these embodiments, the (B) PVC polymer has softening point temperature of less than 250° C., alternatively less than 225° C., alternatively less than 200° C. The softening point temperature may also be referred to as the processing temperature. In at least one embodiment, the (B) PVC polymer has a softening point temperature ranging from 150 to 250° C., such as from 160 to 220° C. or from 170 to 210° C. Preferably, the (B) PVC polymer is a powder.

Elastomers and/or rubbers can be added to or compounded with the (B) PVC polymer to modify or improve properties, such as impact strength. Preferably, the (B) PVC polymer comprises at least one acrylic processing additive. Additives may include those known in the art, such as the additives disclosed by Stevenson et al., Journal of Vinyl Technology, December 1993, Vol. 15, No. 4, pages 244-251, which is incorporated herein by reference.

In certain embodiments, the polymer in the PVC composition consists essentially of a PVC polymer. By consist essentially of, it is meant that the (B) PVC polymer can include one or more additional polymers other than a polyvinyl so long as such additional polymers can be processed along with the (B) PVC polymer to form the polymer composite article. When the (B) PVC polymer does not consist of a PVC polymer, the (B) PVC polymer typically includes a PVC polymer in an amount of at least 50, alternatively at least 60, alternatively at least 65, alternatively at least 70, alternatively at least 75, alternatively at least 80, alternatively at least 85, alternatively at least 90, alternatively at least 95, alternatively at least 96, alternatively at least 97, alternatively at least 98, alternatively at least 99, wt. % based on the total weight of the (B) PVC polymer utilized in the composition.

The (B) PVC polymer may further comprise an elastomer. Non-limiting examples of elastomers include styrene-butadiene rubber, polyether urethane rubber, polyester urethane rubber, butyl rubber, nitrile rubber, chloroprene rubber (neoprene), polyacrylate rubber, ethylene acrylate rubber, ethylene-propylene rubber, ethylene-propylene-diene rubber, ethylene propylene diene monomer (EPDM), ethylene propylene rubber (EPR), fluorosilicone rubber, fluorocarbon rubber, perfluorinated elastomer, styrene butadiene rubber, chlorosulfonated polyethylene, polyisoprene rubber, polysulfide rubber, ethylene acrylate rubber, epichlorohydrine rubber, perfluoroelastomer (e.g. Kalrez™), polysulfide rubber, chlorinated polyethylene (e.g. chlorinated polyethylene comprising up to 40 weight percent chlorine), and combinations thereof.

When the (B) PVC polymer comprises a polymer other than and in addition to a PVC, the (B) PVC polymer may further comprise at least one polymer that is fully or partially thermodynamically miscible with PVC. Such polymer include, but are not limited to, poly(methyl methacrylate) (PMMA), polyethylene oxide (PEO), thermoplastic polyurethane (TPU), polycaprolactone (CPL), and styrene-acrylonitrile resin (SAN). Other thermodynamically miscible polymers are known in the art and are disclosed, for example, Robeson, L. M. (1990), Miscible polymer blends containing poly(vinyl chloride). J. Vinyl Addit. Technol., 12: 89-94, which is incorporated herein by reference.

Regardless of the (B) PVC polymer utilized, the (B) PVC polymer can comprise virgin polymer and/or recycled polymer. The recycled polymer, if utilized, may be sourced from industrial production streams, as well as from post-industrial and/or post-consumer sources. The selection of the (B) PVC polymer, as well as any ratio of virgin polymer to recycled polymer, if utilized in concert, is typically a function of cost and desired properties of the polymer composite article formed therewith.

The amount of the (A) mineral filler is greater than the amount of the (B) PVC polymer in the PVC composition, i.e., the ratio of the (A) mineral filler to the (B) PVC polymer is greater than 1.

The (B) PVC polymer may be present in the composition in an amount of from 20 to 92, alternatively from 35 to 90, and alternatively from 40 to 49.5, weight percent based on the total weight of (A), (B), and (C) in the composition. For example, the (B) PVC polymer may be present in the composition in an amount of at least 20, at least 25, at least 30, at least 35, or at least 40, weight percent based on the total weight of (A), (B), and (C) in the composition. The (B) PVC polymer may be present in the composition in an amount of 92 wt. % or less, 90 wt. % or less, 85 wt. % or less, 80 wt. % or less, 75 wt. % or less, 70 wt. % or less, 65 wt. % or less, 60 wt. % or less, or 55 wt. % or less, based on the total weight of (A), (B), and (C) in the composition. In specific embodiments, it is desirable to minimize the relative amount of the (B) PVC polymer in the composition, which may reduce overall cost thereof depending on selection, so long as desirable properties of the polymer composite article formed therewith are maintained or obtained. One of skill in the art understands that the amount of the (B) PVC polymer may be modified for this purpose, including a balance of cost and resulting properties, as well as the presence or absence of other optional components, as described below.

(C) Polydiorganosiloxane

The composition further comprises (C) a polydiorganosiloxane. The (C) polydiorganosiloxane of formula (I):

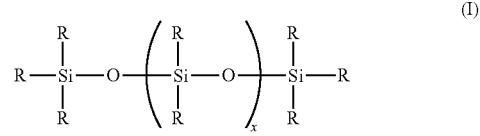

where each R is an independently selected monovalent hydrocarbon group of 1 to 18 carbon atoms that is free of aliphatic unsaturation, and subscript x has a value sufficient to give the polydiorganosiloxane a viscosity of greater than 350 mPa·s to 100,000 mPa·s measured at 25° C. at 0.1 RPM to 50 RPM on a Brookfield DV-III cone & plate viscometer with #CP-52 spindle. One skilled in the art would recognize that rotation rate decreases as viscosity increases and would be able to select the appropriate rotation rate when using this test method to measure viscosity. Alternatively, viscosity may be 5,000 mPa·s to 20,000 mPa·s, alternatively 5,000 mPa·s to 15,000 mPa·s, and alternatively 5,000 mPa·s to 12,500 mPa·s, measured according to the test method described above at 5 RPM.

Alternatively, each R may be an alkyl group of 1 to 18 carbon atoms, alternatively 1 to 12 carbon atoms, alternatively 1 to 6 carbon atoms, and alternatively 1 to 4 carbon atoms. Suitable alkyl groups include methyl, ethyl, propyl (including n-propyl and iso-propyl), and butyl (including n-butyl, tert-butyl, sec-butyl, and iso-butyl). Alternatively, each R may be methyl.

Suitable polydiorganosiloxanes may be prepared by methods known in the art such as hydrolysis and condensation of appropriate organohalosilane monomers and/or equilibration of linear and cyclic polyorganosiloxanes optionally with endcapping. The polydiorganosiloxane may be a trimethylsiloxy-terminated polydimethylsiloxane, which is commercially available. Trimethylsiloxy-terminated polydimethylsiloxanes with viscosities of greater than 350 mPa·s to 100,000 mPa·s are commercially available from Dow Silicones Corporation of Midland, Michigan, USA.

The (C) organopolysiloxane may comprise two or more different organopolysiloxanes, which may be independently selected. Typically, the (C) organopolysiloxane serves as a process aid in the composition and the polymer composite article. Without wishing to be bound by theory, the (C) organopolysiloxane may be an internal and/or external process aid. However, the (C) organopolysiloxane may serve other purposes, in addition to or alternatively to serving as a process aid, e.g. to modify physical or mechanical properties of the composition and the polymer composite article.

Generally speaking, various advantages can be realized by the combination of the (A) mineral filler, the (B) PVC polymer, and the (C) organopolysiloxane. When the composition is mixed in an extruder, for example, combination of the (A) mineral filler, the (B) PVC polymer, and the (C) organopolysiloxane generally reduces a melt temperature of the composition in the extruder. The reduction in melt temperature refers to the temperature of the composition in the extruder and Brabender as opposed to the melting point temperature of any one individual component in the composition (and in the extruder). Importantly, this allows for processing of the composition at reduced temperatures, which provides myriad benefits, including cost and aesthetics. For example, certain fillers, such as lignocellulosic fillers, can char or degrade at certain elevated processing temperatures of the composition, typically required to make the composition flowable. Use of combination of the (A) mineral filler, the (B) PVC polymer, and the (C) organopolysiloxane allows for preparing the polymer composite article at a reduced temperature without degrading, charring or otherwise deleteriously impacting the (A) mineral filler and other aspects of the polymer composite article. Moreover, when the composition is mixed in an extruder, a torque of the extruder is generally reduced by combination of (A) mineral filler, the (B) PVC polymer, and the (C) organopolysiloxane. Reduced torque allows for greater output, which is particularly important from the perspective of production throughput.

In certain embodiments, (i) an extrusion processing temperature reduced as compared to an extrusion processing temperature of a mixture of the (A) mineral filler and the (B) PVC polymer without the (C) polydiorganosiloxane; and/or (ii) a torque of the extruder is reduced when mixing the composition as compared to a torque of the extruder when extruding a mixture of the (A) mineral filler and the (B) PVC polymer without the (C) polydiorganosiloxane. Extrusion processing temperature is the temperature at which the composition is generally processable in the extruder, e.g. to melt the (B) PVC polymer and other components in the composition. Extrusion processing temperature is distinguished from the melting point temperature of any one component in the composition.

The (C) polydiorganosiloxane may be present in an amount of from greater than 0 to 5, alternatively from 0.1 to 2.5, and alternatively from 0.5 to 1, weight percent based on the total weight of (A), (B), and (C) in the composition. For example, the (C) polydiorganosiloxane may be present in an amount of at least 0.1, at least 0.25, or at least 0.5, weight percent based on the total weight of (A), (B), and (C) in the composition. The (C) polydiorganosiloxane may be present in an amount of 5 wt. % or less, 4 wt. % or less, 3 wt. % or less, or 2.5 wt. % or less, based on the total weight of (A), (B), and (C) in the composition.

The (C) polydiorganosiloxane may be utilized in a neat (unadulterated) form but alternatively may be provided in any other suitable form, it may for example be provided in a diluted liquid form in combination with a carrier vehicle or alternatively may be provided in a solid form. In certain embodiments, the (C) polydiorganosiloxane is a liquid at 25° C.

In certain embodiments, in addition to components (A) mineral filler, (B) polymer, and the (C) polydiorganosiloxane, the composition for preparing the polymer composite article as described above further comprises one or more additives selected from a colorant (e.g., pigment and/or dye), a blowing agent (e.g., chemical and/or physical), a UV and/or light stabilizer, a process aid, a preservative, a biocide (e.g., fungicide, herbicide, pesticide, antimicrobial), a flame retardant and/or smoke suppressant, an impact modifier, a heat stabilizer, and a lubricant. These components are known in the art and can be used according to conventional practice. Each additive, if utilized, may be present in the composition in an amount of from greater than 0 to 30 weight percent based on the total weight of the composition. The composition may also include other optional additives, as known in the art. Such additives are described, for example, in Walker, Benjamin M., and Charles P. Rader, eds. *Handbook of thermoplastic elastomers*. New York: Van Nostrand Reinhold, 1979; Murphy, John, ed. *Additives for plastics handbook*. Elsevier, 2001; which are incorporated by reference herein.

A method for preparing a polymer composite article is also provided. The method comprises preparing the polymer composite article from the composition. In certain embodiments, the method further comprises forming the composition. The composition is formed by combining at least component the (A) mineral filler, the (B) PVC polymer, and the (C) polydiorganosiloxane, along with any optional components present in the composition.

The components of the composition may be combined in any order and via any suitable manner. In certain embodiments, for example, the (B) PVC polymer may be melted prior to, during, and/or after formation of the composition. For example, the (B) PVC polymer may be heated prior to and/or during combining the components such that the (A) mineral filler and the (C) polydiorganosiloxane are combined with a melted form of the (B) PVC polymer. The (A) mineral filler and the (C) polydiorganosiloxane may be combined with the melted form of the (B) PVC polymer in any order, e.g. individually, sequentially, together, or simultaneously. Alternatively, however, the (B) PVC polymer may be combined with the (A) mineral filler and the (C) polydiorganosiloxane prior to heating or melting the (B) PVC polymer such that the (B) PVC polymer is in solid and unmelted or unsoftened form when preparing the composition. Alternatively, the (A) mineral filler and the (C) polydiorganosiloxane may be combined and heated, then added to the (B) PVC polymer in solid or liquid form when preparing the composition.

Preferably, the (A) mineral filler and the (B) PVC polymer are combined together to form a powder master batch. The (C) polydiorganosiloxane is then combined with the powder master batch and allowed to be absorbed by the powder, after which it can be further blended to ensure uniform dispersion of the (C) polydiorganosiloxane.

A melting point temperature (or glass transition temperature) of the (B) PVC polymer is typically a function of the (B) PVC polymer utilized. For example, certain species of polymers have different melting point temperatures than other species of polymers. In certain embodiments, the (B) PVC polymer is heated before, during, and/or after formation of the composition to a temperature that is greater than the melting point temperature of the (B) polymer, e.g. 10 to 90, alternatively 10 to 40, ° C. higher than the melting point temperature of the (B) polymer. This ensures melting rather than mere softening of the (B) polymer. Alternatively, lower temperatures may be utilized in combination with shear or mixing to ensure softening and/or melting of the (B) polymer.

The composition for preparing the polymer composite article may be formed under mixing or shear, e.g. with suitable mixing equipment. For example, the composition may be formed in a vessel equipped with an agitator and/or mixing blades. The vessel may be, for example, an internal mixer, such as a Banbury, Sigma (Z) Blade, or Cavity Transfer style mixer. Alternatively or in addition, the composition may be formed in or processed by an extruder, which may be any extruder, e.g. a single screw extruder with rotational and/or reciprocating (co-kneader) screws, as well as multi-screw devices comprising two or more screws, which may be aligned tangentially or partially/fully intermeshing, revolving in either a co- or counter-rotational direction. Alternatively, a conical extruder may be used for forming the composition described herein.

As introduced above, the method also comprises preparing the polymer composite article from the composition for preparing the polymer composite article. The composition may be formed, e.g. in the vessel, and subsequently removed from the vessel to form the polymer composite article with separate equipment. Alternatively, the same equipment may be utilized to prepare the composition and subsequently form the polymer composite article. For example, the composition may be prepared and/or mixed in an extruder, and the extruder may be utilized to prepare the polymer composite article with the composition. Alternatively, the polymer composite article may be formed via molding, e.g. with an injection or transfer molding process. The composition may be formed in situ in the mold, or formed independently and disposed in the mold once formed. Alternatively still, the polymeric composite article may be a film. In such embodiments, the composition can be formed or disposed in a vessel, optionally under mixing at an elevated temperature, and disposed in or on equipment to prepare the film from the composition. Such equipment and techniques for preparing films from compositions, particularly those including thermoplastics like the (B) PVC polymer of the composition, are well known in the art.

In certain embodiments, preparing the polymer composite article from the composition further comprises forming the composition into a desired shape. The desired shape depends on end use applications of the polymer composite article. One of skill in the art understands how dies for extrusion and molds for molding may be selected and created based on the desired shape of the polymer composite article.

In certain embodiments, the method is performed continuously or semi-continuously in an extruder, such as a twin screw extruder (in which the screws are concurrently rotated, partially or fully intermeshing, alternatively counter rotated aligned either tangentially or partially or fully intermeshing). In one embodiment, the (C) polydiorganosiloxane is disposed in the extruder concurrently with the (A) mineral filler and the (B) PVC polymer. Alternatively, the (C) polydiorganosiloxane may be disposed in the extruder after melting the (B) PVC polymer and before adding the (A) mineral filler. Alternatively, the (C) polydiorganosiloxane may be disposed in the extruder after the (A) mineral filler and the (B) PVC polymer and before the polymer composite article exits the extruder. Alternatively, the (A) mineral filler may be disposed in the extruder concurrently with the (C) polydiorganosiloxane, where they are heated to effect surface treatment of the (A) mineral filler with the (C) polydiorganosiloxane, then the (B) PVC polymer is disposed in the extruder to give a mixture and the temperature increased to a temperature suitable for compounding the mixture and forming the polymer composite article. The extruder may have one or more zones, such as 1 to 3, or 3 to 8, or 1 to 12, zones, where starting materials can be added. The zones may be heated at different temperatures.

The polymer composite article of the invention is not limited and may be customized for myriad end use applications and industries. By way of example only, the polymer composite article may be utilized in or as tubing; piping; hosing; an insulating (e.g. thermally and/or electrically insulating) article; automotive components or applications, including interior components, e.g. floor mats; consumer products and applications, industrial or commercial products and applications, aerospace products and applications, transportation products and applications, aircraft products and applications, electronics products and applications, residential or commercial building and construction products and applications, e.g. decking, railing, siding, fencing, window framing, flooring, etc.

The invention has been described in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described.

INDUSTRIAL APPLICABILITY

Without wishing to be bound by theory, it is thought that the (C) polydiorganosiloxane may provide one or more benefits to the polymer composites and/or processes for making them described herein. These include:

Decreased density of the foamed polymer composition; leading to lower cost;

Higher expansion of foamed polymer composition, resulting in thicker products at same blowing agent and processing aid loading level, efficient, cost effective formulation;

Better mixing through lower levels of dust and/or sticking of the filler to blender and blades, easy cleaning of blender;

Improved melt strength leading to robust processing, maximize expansion, maximum gas containment;

Increased char content resulting in better flame retardant and smoke suppressant performance;

Improved tribological properties, better wear resistance

Lower shear thinning leading to wider processing window;

Improved cell structure in foamed articles;

Lower torque during compounding can lead to lower power consumption for processing and it can enable higher throughput to improve production yield;

Increased compounding through put and or lower energy consumption;

Better filler dispersion and reduced glass fiber breakup (if glass fibers are used) during compounding and molding;

Ability to mold thinner walls because of improve melt flow;

Ability to include high filler loadings leading to cost saving;

Less reject rates during demolding;

Better surface quality and/or finish which can be a challenge at higher filler level;

Improved elongation irrespective of higher filler loading

Improved impact strength irrespective of higher filler loading

Improved fusion characteristic,

Maintains or improves critical properties even at higher filler loading, resulting in better performance, processing while lowering compound cost Improved melt rheology resulting in less shear susceptible compound providing robust processing Improved hydrophobicity;

Ability to utilize a larger proportion of recycled polymers or different grades; and/or Enabling additives that improve strength and other properties.

EXAMPLES

Examples A1 to A12

Table 1 below shows the types and amounts of components utilized to prepare compositions of Examples A1 to A12 and Comparative Examples 01 and C2. The exemplary polyvinyl chloride formulations were prepared by adding the materials in Table 1 sequentially. A master batch was prepared in about 20 minutes by adding the PVC polymer at room temperature to a Gunther Papenmeier/Welex blender, ramping the power to 15A, adding the heat stabilizer at 125° F., adding the lubricant package at 150° F., adding the impact modifier at 170° F., adding TiO$_2$ at 190° F., and the CaCO$_3$ at 195° F. The siloxane was post-blended at room temperature using a small blender.

TABLE 1

| Example | PVC[1] (phr) | Heat Stabilizer[2] (phr) | Lubricant package[3] (phr) | Impact Modifier[4] (phr) | TiO$_2$ (phr) | CaCO$_3$[5] (phr) | SPA1[6] (phr) | SPA2[7] (phr) | SPA3[8] (phr) |
|---|---|---|---|---|---|---|---|---|---|
| C1 | 100 | 1.2 | 2.45 | 5.0 | 9.0 | 4.0 | — | — | — |
| A1 | 100 | 1.2 | 2.45 | 5.0 | 9.0 | 4.0 | 0.5 | — | — |
| A2 | 100 | 1.2 | 2.45 | 5.0 | 9.0 | 4.0 | 1.0 | — | — |
| A3 | 100 | 1.2 | 2.45 | 5.0 | 9.0 | 4.0 | | 0.5 | — |
| A4 | 100 | 1.2 | 2.45 | 5.0 | 9.0 | 4.0 | | 1.0 | — |
| A5 | 100 | 1.2 | 2.45 | 5.0 | 9.0 | 4.0 | | | 0.5 |
| A6 | 100 | 1.2 | 2.45 | 5.0 | 9.0 | 4.0 | | | 1.0 |
| C2 | 100 | 1.2 | 2.45 | 5.0 | 9.0 | 8.0 | — | — | — |
| A7 | 100 | 1.2 | 2.45 | 5.0 | 9.0 | 8.0 | 0.5 | — | — |
| A8 | 100 | 1.2 | 2.45 | 5.0 | 9.0 | 8.0 | 1.0 | — | — |
| A9 | 100 | 1.2 | 2.45 | 5.0 | 9.0 | 8.0 | | 0.5 | — |
| A10 | 100 | 1.2 | 2.45 | 5.0 | 9.0 | 8.0 | | 1.0 | — |
| A11 | 100 | 1.2 | 2.45 | 5.0 | 9.0 | 8.0 | | | 0.5 |
| A12 | 100 | 1.2 | 2.45 | 5.0 | 9.0 | 8.0 | | | 1.0 |

[1]FORMOLON ® 622 from Formosa having an inherent viscosity of 0.91 as measured in accordance with ASTM D-5225 and a bulk density of 0.52 g/cm$^3$ as measured by ASTM D-1895
[2]ADVASTAB ® TM 181 from PMC Vinyl Additives
[3]Lubricant package contains Paraffin wax 165 from Amerilube, LD 10 calcium stearate from Norac, and A-C ® 629 from Honeywell
[4]PARALOID ™ KMX-100 from The Dow Chemical Company
[5]OMYACARB ® UFT from Omya
[6]SPA1 is a hydroxy-terminated siloxane with a viscosity of 13,500 cst at 25° C. available commercially from Dow Silicones Corporation of Midland, Michigan, USA
[7]SPA2 is a trimethylsiloxy-terminated polydimethylsiloxane with a viscosity of 5,000 mPa · s at 25° C. available commercially from Dow Silicones Corporation of Midland, Michigan, USA
[8]SPA3 is a trimethylsiloxy-terminated polydimethylsiloxane with a viscosity of 12,500 mPa · s at 25° C. available commercially from Dow Silicones Corporation of Midland, Michigan, USA The compositions of Table 1 were milled at 185° C. for 3 minutes on an electric Collin Roll mill with a 0.3 mm gap to give a milled sheet from each composition, then the milled sheet was compression molded to form a 3.2 mm thick plaque at 190° C. Color performance of the plaques was measured using Lab Scan (HunterLab), and notched Izod impact strength (measured in accordance with ASTM D256) was evaluated. These physical properties are set forth in Table 2 below.

TABLE 2

| | Plaque Color | | | | Notched Izod Impact (ASTM D256) |
|---|---|---|---|---|---|
| Example | L* | a* | b* | YI D1925 [C/2] | J/m |
| C1 | 96.09 | −1.33 | 4.46 | 7.09 | 131.0 |
| A1 | 96.32 | −1.24 | 4.15 | 6.56 | 141.3 |
| A2 | 95.46 | −1.09 | 3.20 | 4.94 | 129.8 |
| A3 | 96.39 | −1.24 | 4.16 | 6.57 | 143.2 |
| A4 | | | | | na |
| A5 | 96.40 | −1.29 | 4.25 | 6.71 | 139.4 |
| A6 | 95.75 | −0.93 | 2.92 | 4.53 | 161.8 |
| C2 | 96.28 | −1.35 | 4.46 | 7.07 | 111.2 |
| A7 | 96.20 | −1.40 | 4.56 | 7.22 | 121.4 |
| A8 | 95.69 | −1.09 | 3.31 | 5.14 | 150.9 |
| A9 | 96.20 | −1.28 | 4.20 | 6.63 | 132.9 |

TABLE 2-continued

| Example | Plaque Color | | | YI D1925 [C/2] | Notched Izod Impact (ASTM D256) J/m |
|---|---|---|---|---|---|
| | L* | a* | b* | | |
| A10 | 95.21 | −1.47 | 4.55 | 7.19 | 134.6 |
| A11 | 96.25 | −1.31 | 4.29 | 6.78 | 136.4 |
| A12 | 95.76 | −1.12 | 3.33 | 5.14 | 127.6 |

As shown in Table 2 above, examples containing the trimethylsiloxy-terminated polydimethylsiloxane indicated enhanced color stability during processing and a potentially wider processing window. The examples containing the trimethylsiloxy-terminated polydimethylsiloxane exhibited higher impact strength.

Additional physical properties of the composites made in Examples A1 to A12 and Comparative Examples C1 and C2 were measured and set forth in Tables 3 and 4 below. The physical properties set forth in Table 3 were measured in accordance with ASTM D638 using a type 5 tensile bar and a rate of 0.5 inches/minute. The physical properties set forth in Table 4, which relate to Brabender Rheology Compaction and Fusion Time, Torque were measured using a Brabender mixer, commercially available from Brabender GmbH & Co. KG of Duisburg, Germany, with operating conditions maintained at 60 RPM, 185° C., and 65 gram resin.

TABLE 3

| Example | Yield stress (MPa) | Break stress (MPa) | Break elongation (%) | Modulus (MPa) |
|---|---|---|---|---|
| C1 | 47 | 51 | 124 | 1345 |
| A1 | 45 | 51 | 118 | 1303 |
| A2 | 44 | 45 | 88 | 1275 |
| A3 | 45 | 51 | 124 | 1290 |
| A5 | 45 | 51 | 128 | 1280 |
| A6 | 44 | 48 | 107 | 1264 |
| C2 | 46 | 48 | 122 | 1324 |
| A7 | 46 | 49 | 122 | 1345 |
| A8 | 44 | 48 | 111 | 1294 |
| A9 | 44 | 48 | 111 | 1279 |
| A10 | 43 | 47 | 114 | 1280 |
| A11 | 44 | 45 | 105 | 1262 |
| A12 | 43 | 43 | 97 | 1288 |

TABLE 4

| Example | Fusion Time (s) | Compaction Torque (m · g) | Fusion Torque (m · g) | Equilibrium Torque (m · g) |
|---|---|---|---|---|
| C1 | 32 | 3254 | 3608 | 2068 |
| A1 | 82 | 1959 | 2943 | 2106 |
| A2 | 142 | 1546 | 2731 | 2070 |
| A3 | 106 | 1770 | 3066 | 2097 |
| A4 | 166 | 1281 | 2754 | 2128 |
| A5 | 108 | 1894 | 3045 | 2084 |
| A6 | 158 | 1419 | 2727 | 2112 |
| C2 | 42 | 2876 | 3460 | 2101 |
| A7 | 110 | 1968 | 3898 | 2123 |
| A8 | 156 | 1407 | 2656 | 2089 |
| A9 | 122 | 1729 | 2884 | 2128 |
| A10 | 164 | 1394 | 2576 | 2094 |
| A11 | 132 | 1788 | 2836 | 2112 |
| A12 | 152 | 1286 | 2666 | 2065 |

Example A13 and A14 and Comparative Example C3

Table 5 below shows the types and amounts of components utilized to prepare compositions of Examples A13 and A14 and Comparative Example C3. Example A13 and A14 and Comparative Example C3 have the same composition as Examples A8 and A12 and Comparative Example C2 respectively above. The exemplary polyvinyl chloride formulations were prepared by adding the materials in Table 5 sequentially. A master batch was prepared in about 20 minutes by adding the PVC polymer at room temperature to a Gunther Papenmeier/Welex blender, ramping the power to 15A, adding the heat stabilizer at 125° F., adding the lubricant package at 150° F., adding the impact modifier at 170° F., adding TiO$_2$ at 190° F., and the CaCO$_3$ at 195° F. The master batch powder was then allowed to cool to room temperature. Then the siloxane was added to the master batch powder. After the siloxane was absorbed by the master batch powder, the mixture was placed into a lab Waring blender and blended for a few minutes to achieve uniform siloxane dispersion.

TABLE 5

| Example | PVC[1] (phr) | Heat Stabilizer[2] (phr) | Lubricant package[3] (phr) | Impact Modifier[4] (phr) | TiO$_2$ (phr) | CaCO$_3$[5] (phr) | SPA1[6] (phr) | SPA3[7] (phr) |
|---|---|---|---|---|---|---|---|---|
| C3 | 100 | 1.2 | 2.45 | 5.0 | 9.0 | 8.0 | — | — |
| A13 | 100 | 1.2 | 2.45 | 5.0 | 9.0 | 8.0 | 1.0 | — |
| A14 | 100 | 1.2 | 2.45 | 5.0 | 9.0 | 8.0 | — | 1.0 |

[1]FORMOLON ® 622 from Formosa having an inherent viscosity of 0.91 as measured in accordance with ASTM D-5225 and a bulk density of 0.52 g/cm$^3$ as measured by ASTM D-1895
[2]ADVASTAB ® TM 181 from PMC Vinyl Additives
[3]Lubricant package contains Paraffin wax 165 from Amerilube, LD 10 calcium stearate from Norac, and A-C ® 629 from Honeywell
[4]PARALOID ™ KMX-100 from The Dow Chemical Company
[5]OMYACARB ® UFT from Omya
[6]SPA1 is a hydroxy-terminated siloxane with a viscosity of 13,500 cst at 25° C. available commercially from Dow Silicones Corporation of Midland, Michigan, USA
[7]SPA3 is a trimethylsiloxy-terminated polydimethylsiloxane with a viscosity of 12,500 mPa · s at 25° C. available commercially from Dow Silicones Corporation of Midland, Michigan, USA The formulated PVC listed in Table was milled at 185° C. for 3 minutes on an electric Collin Roll mill with a 0.3 mm gap, then the milled sheet was compression molded to 3.2 mm thick plaque at 190° C. The notched Izod impact strength (measured in accordance with ASTM D256) was evaluated. These physical properties are set forth in Table 6 below.

TABLE 6

| Example | Notched Izod Impact (ASTM D256) | |
|---|---|---|
| | J/m | % Ductility |
| C3 | 586 | 30% |
| A13 | 1263 | 100% |
| A14 | 1298 | 100% |

Examples A15 to A20

Table 7 below shows the types and amounts of components utilized to prepare compositions of Examples A15 to A20 and Comparative Example C4. The exemplary PVC formulations were prepared by adding the materials in Table 7 sequentially. A master batch was prepared in about 20 minutes by adding the PVC polymer at room temperature to a Gunther Papenmeier/Welex blender, ramping the power to 15A, adding the heat stabilizer at 125° F., adding the lubricant package at 150° F., adding the impact modifier at 170° F., adding $TiO_2$ at 190° F., and the $CaCO_3$ at 195° F. The siloxane was post-added at room temperature prior to fusing in a Brabender.

TABLE 7

| Example | $PVC^1$ (phr) | Heat Stabilizer$^2$ (phr) | Lubricant package$^3$ (phr) | Impact Modifier$^4$ (phr) | $TiO_2$ (phr) | $CaCO_3^5$ (phr) | $SPA1^6$ (phr) | $SPA2^7$ (phr) | $SPA3^8$ (phr) |
|---|---|---|---|---|---|---|---|---|---|
| C4 | 100 | 1.2 | 2.45 | 5.0 | 9.0 | 12.0 | — | — | — |
| A15 | 100 | 1.2 | 2.45 | 5.0 | 9.0 | 12.0 | 0.5 | — | — |
| A16 | 100 | 1.2 | 2.45 | 5.0 | 9.0 | 12.0 | 1.0 | — | — |
| A17 | 100 | 1.2 | 2.45 | 5.0 | 9.0 | 12.0 | — | 0.5 | — |
| A18 | 100 | 1.2 | 2.45 | 5.0 | 9.0 | 12.0 | — | 1.0 | — |
| A19 | 100 | 1.2 | 2.45 | 5.0 | 9.0 | 12.0 | — | — | 0.5 |
| A20 | 100 | 1.2 | 2.45 | 5.0 | 9.0 | 12.0 | — | — | 1.0 |

[1] OxyVinyls 225P from Oxy Vinyls, LP having an inherent viscosity of 0.880-0.920, and a bulk density of 0.515-0.575 g/cm³ according to OxyVinyls internal testing methods
[2] ADVASTAB® TM 181 from PMC Vinyl Additives
[3] Lubricant package contains Paraffin wax 165 from Amerilube, LD 10 calcium stearate from Norac, and A-C® 629 from Honeywell
[4] PARALOID™ KMX-100 from The Dow Chemical Company
[5] OMYACARB® UFT from Omya
[6] SPA1 is a hydroxy-terminated siloxane with a viscosity of 13,500 cst at 25° C. available commercially from Dow Silicones Corporation of Midland, Michigan, USA
[7] SPA2 is a trimethylsiloxy-terminated polydimethylsiloxane with a viscosity of 5,000 mPa · s at 25° C. available commercially from Dow Silicones Corporation of Midland, Michigan, USA
[8] SPA3 is a trimethylsiloxy-terminated polydimethylsiloxane with a viscosity of 12,500 mPa · s at 25° C. available commercially from Dow Silicones Corporation of Midland, Michigan, USA The compositions of Table 7 were mixed in a Brabender at 185° C. for 7 minutes at 60 RPM, then the molten polymer was compression molded into a 3.2 mm thick plaque at room temperature (20° C.). The fusion rheology is shown in Table 8, which shows a significant decrease in compaction and fusion torque in the samples containing siloxane.

TABLE 8

| Example | Compaction Time (s) | Compaction Torque (mg) | Fusion Time (s) | Fusion Torque (m · g) | Equilibrium Torque (m · g) |
|---|---|---|---|---|---|
| C4 | 18 | 2490 | 44 | 3465 | 2093 |
| A15 | 28 | 1614 | 118 | 2776 | 2102 |
| A16 | 42 | 1185 | 170 | 2502 | 2072 |
| A17 | 30 | 1645 | 120 | 2799 | 2127 |
| A18 | 50 | 932 | 166 | 2542 | 2107 |
| A19 | 30 | 1834 | 104 | 2899 | 2095 |
| A20 | 44 | 1136 | 152 | 2504 | 2039 |

As shown in Table 9 below, notched Izod impact strength (ASTM D256) and tensile properties per ASTM D638 using a crosshead rate of 0.2 inches/minute were measured. Examples containing siloxane show comparable yield stress, similar or higher break stress, and a similar or higher modulus.

TABLE 9

| Example | Notched Izod Impact (ASTM D256) | | Plastic Tensile Properties (ASTM D638) | | | |
|---|---|---|---|---|---|---|
| | Break Energy J/m | % Ductile % | Yield stress (MPa) | Break stress (MPa) | Break elongation (%) | Modulus (MPa) |
| C4 | 200.0 | 60 | 41.4 | 10.9 | 21.9 | 1686 |
| A15 | 207.4 | 60 | 41.0 | 11.1 | 15.2 | 1766 |
| A16 | 127.3 | 100 | 37.9 | 9.4 | 10.3 | 1765 |
| A17 | 156.1 | 40 | 40.6 | 13.9 | 13.6 | 1914 |
| A18 | 157.7 | 60 | 41.4 | 17.3 | 31.5 | 1764 |
| A19 | 173.9 | 60 | 42.7 | 24.8 | 42.5 | 1720 |
| A20 | 200.0 | 60 | 41.5 | 11.6 | 13.8 | 1870 |

A second set of examples was formulated similar to those in Examples A15 to A20, with up to all of the original calcium carbonate filler substituted with talc, as shown below in Table 10. The same processes and testing protocols were used as previously described for Examples A15 to A20. Formulations containing talc showed no significant difference in rheology compared to the formulations containing the corresponding levels of calcium carbonate. The effects of talc and siloxane on the mechanical properties of the PVC formulation were intertwined, with some combinations having significantly higher impact strength and ductile performance. Higher moduli were also achieved overall with only 4 phr talc versus 12 phr calcium carbonate.

TABLE 10

| Example | PVC[1] (phr) | Heat Stabilizer[2] (phr) | Lubricant package[3] (phr) | Impact Modifier[4] (phr) | TiO$_2$ (phr) | CaCO$_3$[5] (phr) | Talc (phr) | SPA1[6] (phr) | SPA2[7] (phr) | SPA3[8] (phr) |
|---|---|---|---|---|---|---|---|---|---|---|
| C5 | 100 | 1.2 | 2.45 | 5.0 | 9.0 | 4.0 | 0.0 | — | — | — |
| C6 | 100 | 1.2 | 2.45 | 5.0 | 9.0 | 2.0 | 2.0 | — | — | — |
| C7 | 100 | 1.2 | 2.45 | 5.0 | 9.0 | 0.0 | 4.0 | — | — | — |
| A21 | 100 | 1.2 | 2.45 | 5.0 | 9.0 | 3.0 | 1.0 | 0.5 | — | — |
| A22 | 100 | 1.2 | 2.45 | 5.0 | 9.0 | 2.0 | 2.0 | 0.5 | — | — |
| A23 | 100 | 1.2 | 2.45 | 5.0 | 9.0 | 1.0 | 3.0 | 0.5 | — | — |
| A24 | 100 | 1.2 | 2.45 | 5.0 | 9.0 | 0.0 | 4.0 | 0.5 | — | — |
| A25 | 100 | 1.2 | 2.45 | 5.0 | 9.0 | 2.0 | 2.0 | — | 0.5 | — |
| A26 | 100 | 1.2 | 2.45 | 5.0 | 9.0 | 0.0 | 4.0 | — | 0.5 | — |
| A27 | 100 | 1.2 | 2.45 | 5.0 | 9.0 | 2.0 | 2.0 | — | — | 0.5 |
| A28 | 100 | 1.2 | 2.45 | 5.0 | 9.0 | 0.0 | 4.0 | — | — | 0.5 |

[1]OxyVinyls 225P from Oxy Vinyls, LP having an inherent viscosity of 0.880-0.920, and a bulk density of 0.515-0.575 g/cm$^3$ according to OxyVinyls internal testing methods
[2]ADVASTAB ® TM 181 from PMC Vinyl Additives
[3]Lubricant package contains Paraffin wax 165 from Amerilube, LD 10 calcium stearate from Norac, and A-C ® 629 from Honeywell
[4]PARALOID ™ KMX-100 from The Dow Chemical Company
[5]OMYACARB ® UFT from Omya
[6]SPA1 is a hydroxy-terminated siloxane with a viscosity of 13,500 mPa · s at 25° C. available commercially from Dow Silicones Corporation of Midland, Michigan, USA
[7]SPA2 is a trimethylsiloxy-terminated polydimethylsiloxane with a viscosity of 5,000 mPa · s at 25° C. available commercially from Dow Silicones Corporation of Midland, Michigan, USA
[8]SPA3 is a trimethylsiloxy-terminated polydimethylsiloxane with a viscosity of 12,500 mPa · s at 25° C. available commercially from Dow Silicones Corporation of Midland, Michigan, USA

TABLE 11

| Example | Compaction Time (s) | Compaction Torque (m · g) | Fusion Time (s) | Fusion Torque (m · g) | Equilibrium Torque (m · g) |
|---|---|---|---|---|---|
| C5 | 18 | 3254 | 32 | 3608 | 2068 |
| C6 | 22 | 3246 | 40 | 3557 | 2069 |
| C7 | 18 | 3194 | 38 | 3636 | 2049 |
| A21 | 30 | 1477 | 118 | 2956 | 2103 |
| A22 | 28 | 1836 | 122 | 2871 | 2112 |
| A23 | 34 | 1850 | 112 | 3036 | 2049 |
| A24 | 28 | 1796 | 118 | 2961 | 2084 |
| A25 | 34 | 1725 | 126 | 3020 | 2154 |
| A26 | 34 | 1795 | 124 | 2996 | 2103 |
| A27 | 34 | 1512 | 122 | 2950 | 2109 |
| A28 | 34 | 1844 | 112 | 3013 | 2107 |

TABLE 12

| Example | Notched Izod Impact (ASTM D256) | | Plastic Tensile Properties (ASTM D638) | | | |
|---|---|---|---|---|---|---|
| | Break Energy J/m | % Ductile % | Yield stress (MPa) | Break stress (MPa) | Break elongation (%) | Modulus (MPa) |
| C6 | 105.7 | 40 | 48.9 | 22.6 | 31.4 | 1980 |
| C7 | 84.7 | 0 | 47.7 | 15.3 | 14.4 | 2051 |
| A21 | 179.2 | 0 | 45.3 | 18.3 | 25.3 | 1764 |
| A22 | 161.2 | 20 | 46.1 | 11.2 | 29.4 | 1830 |
| A23 | 61.1 | 0 | 46.8 | 12.8 | 36.5 | 1844 |
| A24 | 81.6 | 40 | 45.5 | 17.5 | 28.4 | 1895 |
| A25 | 93.3 | 20 | 47.2 | 18.7 | 34.6 | 1773 |
| A26 | 79.7 | 0 | 48.8 | 17.4 | 32.7 | 1917 |
| A27 | 48.9 | 0 | 46.6 | 24.7 | 40.7 | 1780 |
| A28 | 66.3 | 0 | 44.5 | 20.9 | 25.1 | 1867 |

Examples B1 to B6 (PVC Foam Decking)

Table 13 below shows the types and amounts of components utilized to prepare compositions of Examples B1 to B6 and Comparative Examples C8 and C9. The exemplary PVC formulations were prepared by adding the materials in Table 13 sequentially. A master batch was prepared in about 20 minutes by adding the PVC polymer at room temperature to a Gunther Papenmeier/Welex blender, ramping the power to 15A, adding the heat stabilizer at 125° F., adding the lubricant package at 150° F., adding the impact modifier at 170° F., adding $TiO_2$ at 190° F., and the $CaCO_3$ at 195° F. The siloxane was post-added at room temperature prior to fusing in a Brabender.

TABLE 13

| Example | PVC[1] (phr) | Heat Stabilizer[2] (phr) | Lubricant package[3] (phr) | Foam Cell Promoter[4] (phr) | Process Aid[5] (phr) | $CaCO_3$[6] (phr) | Talc (phr) | SPA1[7] (phr) | SPA2[8] (phr) | SPA3[9] (phr) |
|---|---|---|---|---|---|---|---|---|---|---|
| C8 | 100 | 1.3 | 2.5 | 5 | 2.2 | 14 | 11 | | | |
| B1 | 100 | 1.3 | 2.5 | 5 | 2.2 | 14 | 11 | 1.0 | | |
| B2 | 100 | 1.3 | 2.5 | 5 | 2.2 | 14 | 11 | | 1.0 | |
| B3 | 100 | 1.3 | 2.5 | 5 | 2.2 | 14 | 11 | | | 1.0 |
| C9 | 100 | 1.3 | 2.5 | 5 | 2.2 | 14 | 16.5 | | | |
| B4 | 100 | 1.3 | 2.5 | 5 | 2.2 | 14 | 16.5 | 1.0 | | |
| B5 | 100 | 1.3 | 2.5 | 5 | 2.2 | 14 | 16.5 | | 1.0 | |
| B6 | 100 | 1.3 | 2.5 | 5 | 2.2 | 14 | 16.5 | | | 1.0 |

[1]FORMOLON ® 614 from Formosa having an inherent viscosity of 0.73 as measured in accordance with ASTM D-5225 and a bulk density of 0.56 g/cm$^3$ as measured by ASTM D-1895
[2]ADVASTAB ® TM 181 from PMC Vinyl Additives
[3]Lubricant package contains Paraffin wax 165 from Amerilube, LD 10 calcium stearate from Norac, and A-C ® 629 from Honeywell
[4]Surecel ™ 467 from The Dow Chemical Company
[5]Paraloid ™ K-175 from The Dow Chemical Company
[6]OMYACARB ® UFT from Omya
[7]SPA1 is a hydroxy-terminated siloxane with a viscosity of 13,500 mPa · s at 25° C. available commercially from Dow Silicones Corporation of Midland, Michigan, USA
[8]SPA2 is a trimethylsiloxy-terminated polydimethylsiloxane with a viscosity of 5,000 mPa · s at 25° C. available commercially from Dow Silicones Corporation of Midland, Michigan, USA
[9]SPA3 is a trimethylsiloxy-terminated polydimethylsiloxane with a viscosity of 12,500 mPa · s at 25° C. available commercially from Dow Silicones Corporation of Midland, Michigan, USA The compositions of Table 13 were milled at 185° C. for 3 minutes on an electric Collin Roll mill with a 0.3 mm gap to give a milled sheet from each composition, then the milled sheet was compression molded to form a 3.2 mm thick plaque at 190° C. Color performance of the plaques was measured using Lab Scan (HunterLab), and notched Izod impact strength (measured in accordance with ASTM D256) was evaluated. These physical properties are set forth in Table 14 below.

TABLE 14

| Example | Plaque Color | | | | Flexural Modulus (ASTM D790) |
|---|---|---|---|---|---|
| | L | a | b | YI D1925 [C/2] | MPa |
| C8 | 70.46 | −4.49 | 14.10 | 30.66 | 2865 |
| B1 | 74.66 | −4.36 | 14.74 | 30.65 | 2726 |
| B2 | 75.52 | −4.27 | 14.84 | 30.63 | 2708 |
| B3 | 75.54 | −4.33 | 15.74 | 32.70 | 2644 |
| C9 | 70.11 | −4.22 | 14.15 | 31.26 | 2949 |
| B4 | 74.89 | −4.01 | 14.83 | 31.15 | 2618 |
| B5 | 75.14 | −3.96 | 14.67 | 30.72 | 2696 |
| B6 | 74.93 | −4.11 | 15.43 | 32.44 | 2766 |

TABLE 15

| Example | Yield stress (MPa) | Break stress (MPa) | Break elongation (%) | Elastic Modulus (MPa) |
|---|---|---|---|---|
| C8 | 53 | 41 | 87 | 1774 |
| B1 | 52 | 26 | 74 | 1707 |
| B2 | 51 | 23 | 48 | 1675 |
| B3 | 50 | 38 | 69 | 1688 |
| C9 | 53 | 25 | 30 | 1856 |
| B4 | 52 | 27 | 45 | 1797 |
| B5 | 52 | 19 | 35 | 1827 |
| B6 | 52 | 28 | 42 | 1831 |

TABLE 16

| Sample ID | Die Melt (° C.) | Die PSI Z3 & Z4 | Extruder Rate (g/30 sec.) | Extruder Torque (Gm) | Density (g/cc) | Expansion (%) | Surface |
|---|---|---|---|---|---|---|---|
| C8 | 173/162 |  | 55.47 | 4725 | 0.33 | 237 | — |
| C9 | 171/164 | 1510/1190 | 51.33 | 4275 | 0.35 | 208 | — |
| B1 | 171/164 |  | 58.41 | 4775 | 0.37 | 210 | improved |
| B2 | 170/163 |  | 58.30 | 5025 | 0.36 | 205 | improved |
| B3 | 172/163 | 1600/1220 | 56.37 | 5075 | 0.36 | 218 | improved |
| B4 | 170/163 | 1575/1190 | 53.76 | 4950 | 0.36 | 203 | improved |
| B5 | 170/164 | 1560/1180 | 52.41 | 4775 | 0.36 | 206 | improved |
| B6 | 170/164 | 1535/1160 | 50.05 | 4600 | 0.36 | 201 | improved |

As shown in Table 16, at the same filler loading levels, examples containing siloxane showed lower foam density and improved surface appearance.

TABLE 17

| Sample | Compaction Torque (mg) | Fusion Time (s) | Fusion Torque (mg) | Equilibrium Torque (mg) |
|---|---|---|---|---|
| C8 | 3092 | 32 | 4085 | 2155 |
| C9 | 2860 | 34 | 4130 | 2157 |
| B1 | 1930 | 62 | 2984 | 2059 |
| B2 | 1921 | 68 | 2948 | 2070 |
| B3 | 1953 | 62 | 3241 | 2150 |
| B4 | 1459 | 70 | 2863 | 2069 |
| B5 | 1693 | 58 | 2888 | 2079 |
| B6 | 1664 | 66 | 2925 | 2094 |

Examples D1 to D4 (PVC LVT Rigid Foam Layer)

Table 18 below shows the types and amounts of components utilized to prepare compositions of Examples D1 to D4 and Comparative Examples 010 and C11. The exemplary PVC formulations were prepared by adding the materials in Table 18 sequentially. The dry blends were prepared by adding the PVC at room temperature to a Gunther Papenmeier/Welex blender, ramping the power to 15A, adding the heat stabilizer at 125° F., adding the lubricant package including siloxane at 150° F., adding the acrylic processing aids at 170° F., adding TiO$_2$ at 190° F., and CaCO$_3$ at 195° F. After the powder was blended it was cooled to room temperature.

TABLE 18

| Component | C10 | C11 | D1 | D2 | D3 | D4 |
|---|---|---|---|---|---|---|
| PVC[1] | 100 | 100 | 100 | 100 | 100 | 100 |
| Heat Stabilizer[2] | 1.5 | 1.5 | 1.5 | 1.5 | 1.5 | 1.5 |
| SPA2[3] |  |  | 2 |  | 2 |  |
| SPA3[4] |  |  |  | 2 |  | 2 |
| Calcium Stearate[5] | 1 | 1 | 1 | 1 | 1 | 1 |
| F1020[6] | 0.9 | 0.9 | 0.9 | 0.9 | 0.9 | 0.9 |
| Paraffin Wax[7] | 0.5 | 0.5 | 0.5 | 0.5 | 0.5 | 0.5 |
| AC629A[8] | 0.5 | 0.5 | 0.5 | 0.5 | 0.5 | 0.5 |
| Surecel ™ 467[9] | 12 | 12 | 12 | 12 | 12 | 12 |
| Paraloid ™ K-175[10] | 1 | 1 | 1 | 1 | 1 | 1 |
| CaCO$_3$[11] | 100 | 140 | 100 | 100 | 140 | 140 |
| Extend 73[12] | 1.25 | 1.25 | 1.25 | 1.25 | 1.25 | 1.25 |

[1]FORMOLON ® 614 from Formosa having an inherent viscosity of 0.73 as measured in accordance with ASTM D-5225 and a bulk density of 0.56 g/cm$^3$ as measured by ASTM D-1895
[2]ADVASTAB ® TM 181 from PMC Vinyl Additives
[3]SPA2 is a trimethylsiloxy-terminated polydimethylsiloxane with a viscosity of 5,000 mPa · s at 25° C. available commercially from Dow Silicones Corporation of Midland, Michigan, USA
[4]SPA3 is a trimethylsiloxy-terminated polydimethylsiloxane with a viscosity of 12,500 mPa · s at 25° C. available commercially from Dow Silicones Corporation of Midland, Michigan, USA
[5]LD 10 calcium stearate from Norac, and A-C ® 629 from Honeywell
[6]F1020 internal lubricant from PMC Vinyl Additives
[7]Paraffin Wax 165F from Amerilube
[8]A-C ® 629A from Honeywell
[9]Surecel ™ 467 from The Dow Chemical Company
[10]PARALOID ™ K-175 from The Dow Chemical Company
[11]OMYACARB ® UFT from Omya
[12]FICEL ® Extend 73 from Hughes Polymer Additives Corp.

The formulated PVC samples were milled at 170° C. for 5 minutes on an electric Collin Roll mill with a 0.3 mm gap, then the milled sheet was compression molded to 3.2 mm thick plaque at 175° C. Sample were cut for Izod impact (un-notched) strength (measured per ASTM D256), tensile strength (ASTM D 638) and Heat Distortion Temperature (HDT) (ASTM D648). For density, expansion and processing condition studies foam rods were extruded using a lab twin screw extruder RS 5000 from Polylab, with a 4.78 mm rod die. The extrusion temperature setting was: 170° C./175° C./185° C./180° C. (die) with screw speed 60 RPM. Time to floor was reported as a time melt/rod took to reach floor from die. Fusion study was done on Brabender Intelli Torque 7150 at 190° C., 60 rpm, 7 min, 74 grams for 100 PHR CaCO$_3$, 78 grams for 140 PHR CaCO$_3$. Material from Brabender was pressed into a flat plaque which was cut into pieces to feed capillary of rheometer to melt viscosity measurement at 190° C.

TABLE 19

|  | C10 | D1 | D2 | C11 | D3 | D4 |
|---|---|---|---|---|---|---|
| Yield Elongation (%) | 2.534 | 2.684 | 2.744 | 2.059 | 2.288 | 2.308 |
| Break Elongation (%) | 20.826 | 22.72 | 27.38 | 4.76 | 17.742 | 17.006 |
| Yield Stress (PSI) | 4922 | 4424 | 4476 | 4518 | 3970 | 4136 |
| Break Stress (PSI) | 2126 | 3776 | 3546 | 2248 | 3406 | 3326 |
| Modulus (PSI) | 218600 | 188740 | 184660 | 225400 | 191300 | 201300 |
| Break Energy (Ft-lbf/in.) | 12.20 | 11.02 | 13.13 | 6.37 | 7.82 | 6.31 |
| HDT (° C.) | 63.9 | 62.9 | 62.8 | 62.5 | 62.3 | 62.1 |
| Compaction | | | | | | |
| Time (sec) | 26 | 38 | 30 | 36 | 30 | 32 |
| Torgue (M-g) | 1398 | 1131 | 1342 | 1293 | 1468 | 1352 |
| Temp (° C.) | 156 | 168 | 164 | 161 | 166 | 166 |
| Fusion 1 | | | | | | |
| Time (sec) | 56 | 62 | 56 | 72 | 56 | 60 |
| Torgue (M-g) | 4499 | 2870 | 2994 | 4636 | 3535 | 3589 |
| Temp (° C.) | 179 | 181 | 179 | 187 | 182 | 183 |
| Fusion 2 | | | | | | |
| Time (sec) | 78 | 108 | 102 | 82 | 134 | 100 |
| Torgue (M-g) | 4440 | 3288 | 3371 | 4518 | 3686 | 3699 |
| Temp (° C.) | 191 | 195 | 194 | 192 | 196 | 197 |
| Equilibrium (7 min) | | | | | | |
| Torgue (M-g) | 2610 | 2483 | 2521 | 2791 | 2618 | 2635 |
| Temp (° C.) | 213 | 211 | 211 | 215 | 212 | 213 |

Definitions and Usage of Terms

Unless otherwise indicated by the context of the specification, all amounts, ratios and percentages are by weight, and all test methods are current as of the filing date of this disclosure. The articles "a", "an" and "the" each refer to one or more. It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The term "composition," as used herein, includes material(s) which comprise the composition, as well as reaction products and decomposition products formed from the materials of the composition.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities may be incorporated into and/or within the polymer.

"Blend", "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Blends are not laminates, but one or more layers of a laminate may contain a blend.

What is claimed is:

1. A polyvinyl chloride (PVC) composition for preparing a polymer composite article, said composition comprising:
(A) a mineral filler in an amount of from 7.5 to 75 wt. %;
(B) a polyvinyl chloride polymer in an amount of from 20 to 92 wt. %; and
(C) a polydiorganosiloxane in an amount of from 1 to 4 wt. %, wherein the (C) polydiorganosiloxane is a compound of formula (I):

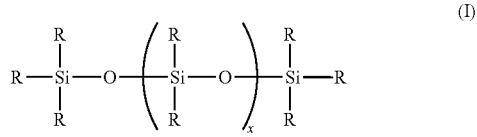

(I)

where each R is an independently selected monovalent hydrocarbon comprising an alkyl group of 1 to 12 carbon atoms that is free of aliphatic unsaturation, and subscript x has a value sufficient to give the (C) polydiorganosiloxane a viscosity of 5,000 mPa·s to 20,000 mPa·s measured at 25° C. at 0.1 RPM to 50 RPM on a Brookfield DV-III cone & plate viscometer with #CP-52 spindle;
each based on the total weight of components (A), (B) and (C) in said composition.

2. The composition of claim 1, where in the (C) polydiorganosiloxane, each R is an alkyl group of 1 to 6 carbon atoms.

3. The composition of claim 1, wherein in the (C) polydiorganosiloxane, each R is selected from the group consisting of methyl, ethyl, propyl, and butyl.

4. The composition of claim 1, wherein: (i) said (A) mineral filler is present in an amount of from 10 to 65 wt. %; (ii) said (B) polyvinyl chloride polymer is present in an amount of from 35 to 90 wt. %; and (iii) said (C) polydiorganosiloxane is present in an amount of from 0.1 to 2.5 wt. %.

5. The composition of claim 1, wherein: (i) said (A) mineral filler is present in an amount of from 49.5 to 60 wt. %; (ii) said (B) polyvinyl chloride polymer is present in an amount of from 40 to 49.5 wt. %; and (iii) said (C) polydiorganosiloxane is present in an amount of from 0.5 to 1 wt. %.

6. The composition of claim 1, wherein the mineral filler is selected from calcium carbonate, talc, and combinations thereof.

7. The composition of claim 1, further comprising one or more additives selected from a colorant, a blowing agent, a UV and/or light stabilizer, a process aid, a preservative, a biocide, a flame retardant and/or smoke suppressant, an impact modifier; a heat stabilizer, and a lubricant.

8. A method of preparing the composition of claim 1, said method comprising:
combining (A) said mineral filler, (B) said polyvinyl chloride polymer, and (C) said polydiorganosiloxane, thereby preparing the composition.

9. A method of preparing a polymer composite article, said method comprising:
preparing the polymer composite article from the composition of claim 1.

10. The method of claim 9, wherein the method comprises:
combining the (A) mineral filler, the (B) polyvinyl chloride polymer, and the (C) polydiorganosiloxane at an elevated temperature under mixing to give a flowable mixture; and
forming the polymer composite article from the flowable mixture.

11. The method of claim 10, wherein: (i) the (C) polydiorganosiloxane is a liquid when combining the flowable mixture with the (C) polydiorganosiloxane.

12. The method of claim 8, wherein: (i) preparing the polymer composite article from the composition further comprises forming the composition into a desired shape; (ii) preparing the polymer composite article from the composition comprises extruding the composition; (iii) preparing the polymer composite article from the composition comprises molding the composition; or (iv) any combinations of (i) to (iii).

13. The method of claim 8 carried out in an extruder, wherein: (i) an extrusion processing temperature of the composition in the extruder is reduced as compared to an extrusion processing temperature of a mixture of the (A) mineral filler and the (B) polyvinyl chloride polymer without the (C) polydiorganosiloxane; and/or (ii) a torque of the extruder is reduced when mixing the composition as compared to a torque of the extruder when extruding a mixture of the (A) mineral filler and the (B) PVC polymer without the (C) polydiorganosiloxane.

14. A polymer composite article prepared by the method of claim 8.

* * * * *